(12) United States Patent
Son et al.

(10) Patent No.: US 8,319,460 B2
(45) Date of Patent: Nov. 27, 2012

(54) METHOD AND SYSTEM FOR INITIATING OPERATION OF AN ELECTRIC MOTOR

(75) Inventors: Yo Chan Son, Torrance, CA (US); Jihoon Jang, Torrance, CA (US); Brian A. Welchko, Torrance, CA (US); Nitinkumar R. Patel, Cypress, CA (US); Steven E. Schulz, Torrance, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 482 days.

(21) Appl. No.: 12/606,839

(22) Filed: Oct. 27, 2009

(65) Prior Publication Data

US 2011/0095713 A1    Apr. 28, 2011

(51) Int. Cl.
*H02P 6/04* (2006.01)

(52) U.S. Cl. ............... 318/400.11; 318/400.21; 318/254; 318/268

(58) Field of Classification Search .......... 318/254, 318/268, 439, 400.11, 400.21, 400.36
See application file for complete search history.

(56) References Cited

U.S. PATENT DOCUMENTS

| | | | |
|---|---|---|---|
| 5,444,351 A | 8/1995 | Yamamura et al. | |
| 5,703,449 A | 12/1997 | Nagate et al. | |
| 5,744,921 A | 4/1998 | Makaran | |
| 6,788,490 B2 | 9/2004 | Schillaci et al. | |
| 6,894,454 B2 | 5/2005 | Patel et al. | |
| 7,211,984 B2 | 5/2007 | Patel et al. | |
| 7,274,161 B2 * | 9/2007 | Mori et al. | 318/400.36 |
| 7,288,911 B2 * | 10/2007 | MacKay | 318/400.21 |
| 7,414,425 B2 * | 8/2008 | O'Gorman et al. | 324/765.01 |
| 7,557,530 B2 | 7/2009 | Tesch et al. | |
| 7,652,441 B2 | 1/2010 | Ying Yin Ho | |
| 2003/0218444 A1 | 11/2003 | Marcinkiewicz et al. | |
| 2005/0179264 A1 | 8/2005 | Ganev | |
| 2005/0248361 A1 * | 11/2005 | O'Gorman et al. | 324/772 |
| 2005/0258788 A1 * | 11/2005 | Mori et al. | 318/254 |
| 2006/0097688 A1 | 5/2006 | Patel et al. | |
| 2006/0119312 A1 | 6/2006 | Okamura et al. | |
| 2007/0069676 A1 * | 3/2007 | MacKay | 318/439 |
| 2007/0069677 A1 * | 3/2007 | MacKay | 318/439 |
| 2007/0145939 A1 | 6/2007 | Tajima et al. | |

(Continued)

FOREIGN PATENT DOCUMENTS

CN    1976213 A    12/2010

OTHER PUBLICATIONS

Office Action dated Aug. 18, 2011 for U.S. Appl. No. 11/947,501.

(Continued)

*Primary Examiner* — Paul Ip
(74) *Attorney, Agent, or Firm* — Ingrassia Fisher & Lorenz, P.C.

(57) ABSTRACT

Methods and systems for controlling an electric motor are provided. The motor includes a plurality of windings. Each winding is coupled to a respective set of first and second switches. The first switch of each set of switches is simultaneously activated. Current flow through the plurality of windings is measured while the first switch of each set of switches is activated. The electric motor is controlled according to a first motor control method if the measured current is below a predetermined threshold. The electric motor is controlled according to a second motor control method if the measured current is above the predetermined threshold.

17 Claims, 3 Drawing Sheets

U.S. PATENT DOCUMENTS

| | | | |
|---|---|---|---|
| 2007/0164694 A1 | 7/2007 | Boscolo Berto | |
| 2008/0018274 A1* | 1/2008 | Mori et al. | 318/268 |
| 2009/0140676 A1 | 6/2009 | Son et al. | |
| 2009/0184678 A1 | 7/2009 | Son et al. | |
| 2010/0064706 A1 | 3/2010 | Hattori et al. | |

OTHER PUBLICATIONS

Office Action dated Nov. 17, 2010, issued in Chinese Patent Application No. 200910002790.6.

Pan, H., et al. "Improving the start and restart behavior through state recognition of AC drives," IEEE Proceeding of the Power Conversion Conference, Aug. 3-6, 1997, pp. 589-594, Vol. 2.

Taniguchi, S., et al. "Starting Procedure of Rotational Sensorless PMSM in the Rotating Condition," IEEE Transactions on Industry Applications, Jan.-Feb. 2009, pp. 194-202, vol. 45, No. 1.

Son, Y-C., et al. "Sensorless Operation of Permanent Magnet Motor Using Direct Voltage Sensing Circuit," IEEE Transactions on Industry Applications, 2002, pp. 1674-1678, vol. 3.

Office Action dated Oct. 25, 2010, issued in U.S. Appl. No. 12/017,817.

U.S. Office Action, dated Jun. 27, 2012, issued in U.S. Appl. No. 11/947,501.

U.S. Notice of Allowance, dated Aug. 17, issued in U.S. Appl. No. 11/947,501.

* cited by examiner

METHOD AND SYSTEM FOR INITIATING OPERATION OF AN ELECTRIC MOTOR

TECHNICAL FIELD

The present invention generally relates to the control of electric motors. More specifically, the present invention relates to a method and system for initiating operation of an electric motor, such as a permanent magnetic alternating current electric motor used in a drive system of an automobile.

BACKGROUND OF THE INVENTION

In recent years, advances in technology, as well as ever evolving tastes in style, have led to substantial changes in the design of automobiles. One of the changes involves the complexity of the electrical and drive systems within automobiles, particularly alternative fuel vehicles, such as hybrid, electric, and fuel cell vehicles. Such alternative fuel vehicles typically use an electric motor, perhaps in combination with another actuator, to drive the wheels.

Traditional motor control systems normally include a feedback device or position sensor, such as a resolver or encoder, to provide speed and position information about the motor. Feedback devices and associated interface circuits increase the costs of a motor control system, and these costs may become undesirable in high volume applications such as the production of automobiles. Additionally, a position sensor and its associated wiring harness increase the complexity and assembly time of an electric drive system in a vehicle.

As production volumes of alternative fuel vehicles increase, manufacturers are increasingly striving to reduce costs and the number of parts of a vehicle. The removal of a feedback device for an electric motor control system significantly reduces the manufacturing costs of an alternative fuel vehicle.

Currently, electric and hybrid electric vehicles often utilize numerous electric motor control technologies, such as the vector control of electric motors. A vector motor control scheme is a computationally intensive motor control scheme that maps the phase voltages/currents of a three-phase motor into a two-axis coordinate system. The hardware used to excite an electric motor using a vector control scheme is typically a three-phase power source inverter with, for example, six power transistors that shape the output voltage to the motor. Vector control requires rotor position information, which is normally obtained via a feedback device or position sensor.

Recently, sensorless control algorithms have been developed that do not use a position or speed sensor but utilize the motor voltage (command to the inverter) and current (feedback from the current sensor) to estimate the motor position and speed. However, at the beginning of the operation or during the restart, the motor voltage information is not available without measuring the actual motor voltage.

In the case of a permanent magnet motor, it is sometimes possible to identify the motor position and speed by measuring the motor terminal voltage using the analog circuit if the motor speed is high enough. However, such a method is sometimes not favorable due to isolation and reliability issues.

Accordingly, it is desirable to provide an improved method and system for initiating the operation of an electric motor when a sensorless control algorithm is used. Furthermore, other desirable features and characteristics of the present invention will become apparent from the subsequent detailed description and the appended claims, taken in conjunction with the accompanying drawings and the foregoing technical field and background.

SUMMARY OF THE INVENTION

A method for controlling an electric motor is provided. The motor includes a plurality of windings. Each winding is coupled to a respective set of first and second switches. The first switch of each set of switches is simultaneously activated. Current flow through the plurality of windings is measured while the first switch of each set of switches is activated. The electric motor is controlled according to a first motor control method if the measured current is below a predetermined threshold. The electric motor is controlled according to a second motor control method if the measured current is above the predetermined threshold.

A machine-readable medium is provided. The machine-readable medium has a set of instructions stored thereon that when performed by a machine causes a method to be performed. The method includes simultaneously activating a first switch of each of a plurality of sets of switches having first and second switches. The plurality of sets of switches are coupled to a plurality of windings in an electric motor. The electric motor further includes a stator and a rotor rotatably coupled to the stator. Current flow through the plurality of windings is monitored while the first switch of each set of switches is activated. The electric motor is controlled according to a first motor control method if the measured current is below a predetermined threshold. The electric motor is controlled according to a second motor control method if the measured current is above the predetermined threshold.

An automotive propulsion system is provided. The automotive propulsion system includes an electric motor having a plurality of windings, a direct current (DC) voltage supply coupled to the electric motor, a power inverter having a plurality of sets of switches coupled to the windings and the DC voltage supply, each of the plurality of sets of switches having a first switch and a second switch, and a processor in operable communication with the electric motor, the DC voltage supply, and the power inverter. The processor is configured to simultaneously activate the first switch of each of the plurality of sets of switches, measure current flow through the plurality of windings while the first switch of each of the plurality of sets of switches is activated, control the electric motor according to a first motor control method if the measured current is below a predetermined threshold, and control the electric motor according to a second motor control method if the measured current is above the predetermined threshold.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description. Additionally, although the schematic diagrams shown herein depict example arrangements of elements, additional intervening elements, devices, features, or components may be present in an actual embodiment. It should also be understood that FIGS. 1-5 are merely illustrative and may not be drawn to scale.

FIG. 1 to FIG. 5 illustrate methods and systems for controlling an electric motor during the initiation of operation of the motor. The electric motor includes a plurality of windings. Each winding is coupled to a respective set of first and second switches. The first switch of each set of switches is simultaneously activated. Current flow through the plurality of windings is measured while the first switch of each set of switches is activated. The electric motor is controlled according to a first motor control method if the measured current is below a predetermined threshold. The electric motor is controlled according to a second motor control method if the measured current is above the predetermined threshold.

The electric motor may include a stator and a rotor rotatably coupled to the stator. The first motor control method may include determining a position of the rotor relative to the stator based on a first motor position algorithm. The second motor control method may include determining the position of the rotor relative to the stator based on a second motor position algorithm. The second motor position algorithm may be based on a measured current, and the first motor position algorithm may be a sensorless motor position algorithm, as is commonly understood.

Figure 1:
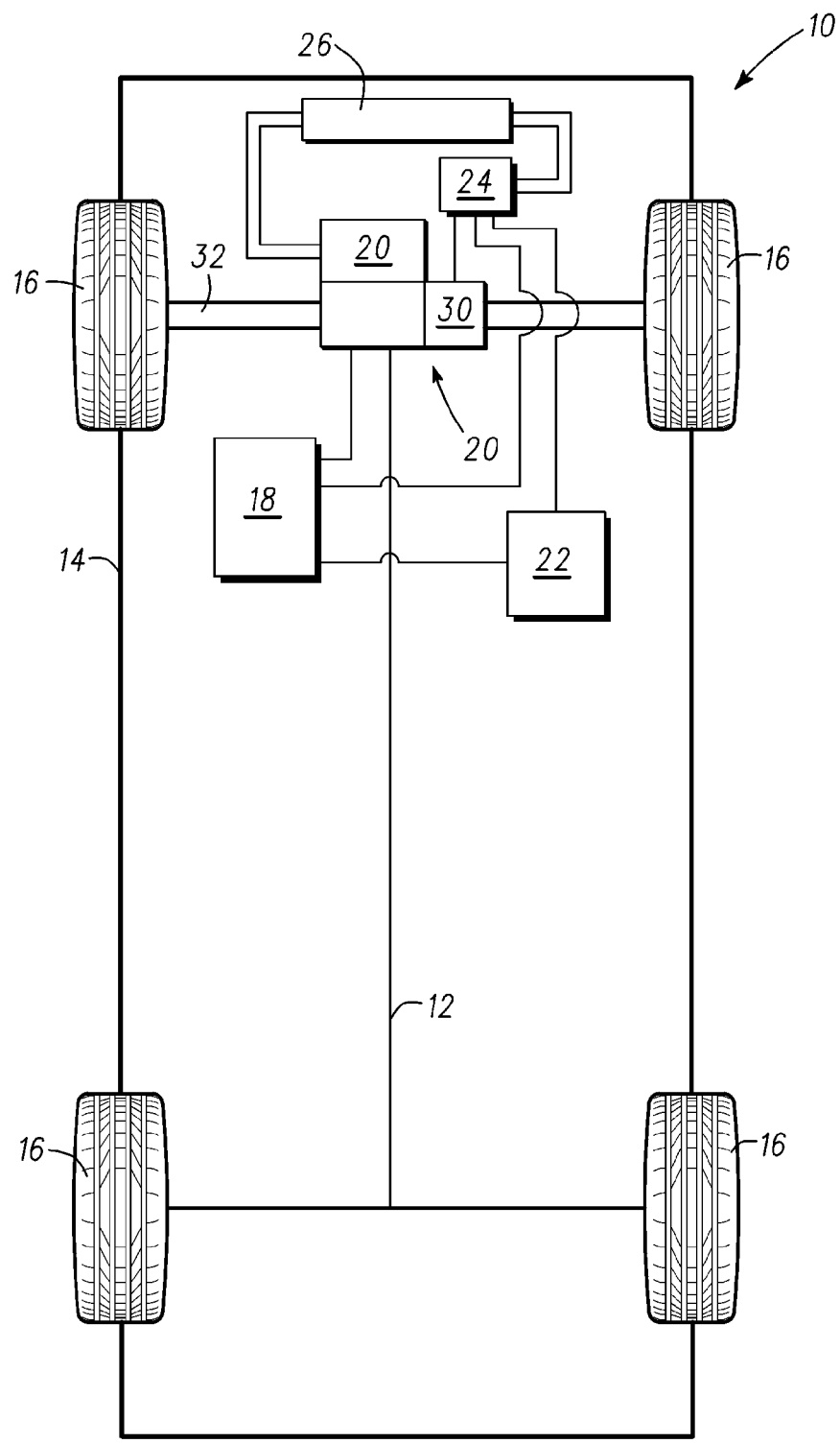
FIG. 1 is a schematic view of an exemplary automobile according to one embodiment of the present invention.

FIG. 1 illustrates a vehicle (or "automobile") 10, according to one embodiment of the present invention. The automobile 10 includes a chassis 12, a body 14, four wheels 16, and an electronic control system 18. The body 14 is arranged on the chassis 12 and substantially encloses the other components of the automobile 10. The body 14 and the chassis 12 may jointly form a frame. The wheels 16 are each rotationally coupled to the chassis 12 near a respective corner of the body 14.

The automobile 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The automobile 10 may also incorporate any one of, or combination of, a number of different types of engines, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine (i.e., such as in a hybrid electric vehicle (HEV)), and an electric motor.

In the exemplary embodiment illustrated in FIG. 1, the automobile 10 is an HEV, and further includes an actuator assembly 20, a battery (or a DC power supply) 22, a power converter assembly (e.g., an inverter or inverter assembly) 24, and a radiator 26. The actuator assembly 20 includes a combustion engine 28 and an electric motor/generator (or motor) 30.

Still referring to FIG. 1, the combustion engine 28 and/or the electric motor 30 are integrated such that one or both are mechanically coupled to at least some of the wheels 16 through one or more drive shafts 32. In one embodiment, the automobile 10 is a "series HEV," in which the combustion engine 28 is not directly coupled to the transmission, but coupled to a generator (not shown), which is used to power the electric motor 30. In another embodiment, the automobile 10 is a "parallel HEV," in which the combustion engine 28 is directly coupled to the transmission by, for example, having the rotor of the electric motor 30 rotationally coupled to the drive shaft of the combustion engine 28.

The radiator 26 is connected to the frame at an outer portion thereof and although not illustrated in detail, includes multiple cooling channels therein that contain a cooling fluid (i.e., coolant) such as water and/or ethylene glycol (i.e., "antifreeze") and is coupled to the engine 28 and the inverter 24.

Referring again to FIG. 1, in the depicted embodiment, the inverter 24 receives and shares coolant with the electric motor 30. However, other embodiments may use separate coolants for the inverter 24 and the electric motor 30. The radiator 26 may be similarly connected to the inverter 24 and/or the electric motor 30.

The electronic control system 18 is in operable communication with the actuator assembly 20, the high voltage battery 22, and the inverter 24. Although not shown in detail, the electronic control system 18 includes various sensors and automotive control modules, or electronic control units (ECUs), such as an inverter control module, a motor controller, and a vehicle controller, and at least one processor and/or a memory which includes instructions stored thereon (or in another computer-readable medium) for carrying out the processes and methods as described below.

Figure 2:
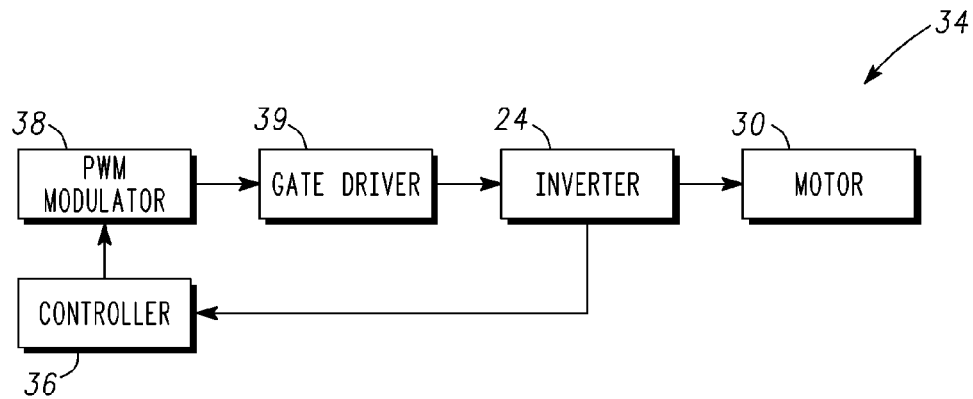
FIG. 2 is a block diagram of an inverter system within the automobile of FIG. 1.

Referring to FIG. 2, an inverter control system (or electric drive system) 34, in accordance with an exemplary embodiment of the present invention, is shown. The voltage source inverter system 34 includes a controller 36 in operable communication with a Pulse Width Modulation (PWM) modulator 38 (or a pulse width modulator) and the inverter 24 (at an output thereof). The PWM modulator 38 is coupled to a gate driver 39, which in turn has an input coupled to an input of the inverter 24. The inverter 24 has a second output coupled to the motor 30. The controller 36 and the PWM modulator 38 may be integral with the electronic control system 18 shown in FIG. 1.

Figure 3:
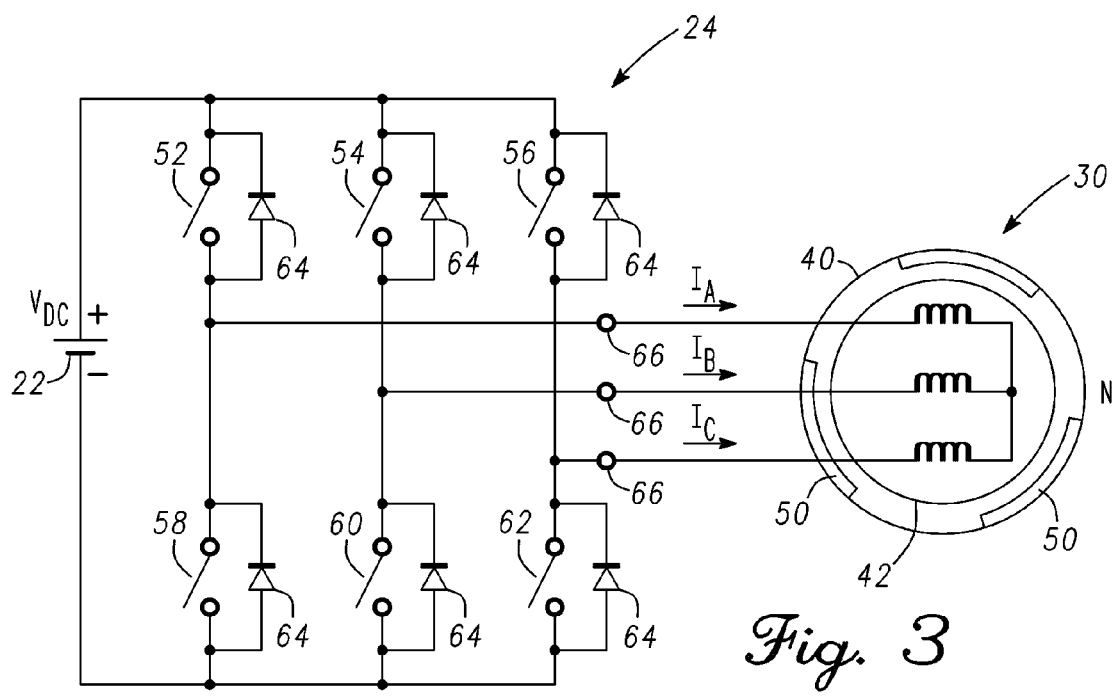
FIG. 3 is a schematic view of a power inverter, a voltage supply, and an electric motor within the automobile of FIG. 1.

FIG. 3 schematically illustrates the battery 22, the inverter 24 (or power converter), and the motor 30 of FIGS. 1 and 2 in greater detail. The inverter 24 includes a three-phase circuit coupled to the motor 30. More specifically, the inverter 24 includes a switch network having a first input coupled to the battery 22 (i.e., a voltage source ($V_{AC}$)) and an output coupled to the motor 30. Although a single voltage source is shown, a distributed DC link with two series sources may be used.

As will be appreciated by one skilled in the art, the electric motor 30, in one embodiment, is a permanent magnet electric motor and includes a stator assembly 40 (including conductive coils or windings) and a rotor assembly 42 (including a ferromagnetic core and/or magnets), as well as a transmission and a cooling fluid (not shown). The stator assembly 40 includes a plurality (e.g., three) conductive coils or windings 44, 46, and 48, each of which is associated with one of three phases of the electric motor 30, as is commonly understood. The rotor assembly 42 includes a plurality of magnets 50 and is rotatably coupled to the stator assembly 40, as is commonly understood. The magnets 50 may include multiple electromagnetic poles (e.g., sixteen poles), as is commonly understood. It should be understood that the description provided above is intended as example of one type of electric motor that may be used.

The switch network comprises three pairs (a, b, and c) of series switches with antiparallel diodes (i.e., antiparallel to each switch) corresponding to each of the phases of the motor 30. Each of the pairs of series switches comprises a first switch, or transistor, (i.e., a "high" switch) 52, 54, and 56 having a first terminal coupled to a positive electrode of the voltage source 22 and a second switch (i.e., a "low" switch) 58, 60, and 62 having a second terminal coupled to a negative electrode of the voltage source 22 and a first terminal coupled to a second terminal of the respective first switch 52, 54, and 56.

As is commonly understood, each of the switches 52-62 may be in the form of individual semiconductor devices such as insulated gate bipolar transistors (IGBTs) within integrated circuits formed on semiconductor (e.g. silicon) substrates (e.g., die). As shown, a diode 64 is connected in an antiparallel configuration (i.e., "flyback" or "freewheeling" diodes) to each of the switches 52-62. As such, each of the switches 52-62 and the respective diode 64 may be understood to form a switch-diode pair or set, six of which are included in the embodiment shown.

Still referring to FIG. 3, the inverter 24 and/or the motor 30 includes a plurality of current sensors 66, each of which is configured to detect the flow of current through a respective one of the windings 44, 46, and 48 of the motor 30 (and/or through the respective switches 52-62 or diodes 64).

During normal operation (i.e., driving), referring to FIG. 1, the automobile 10 is operated by providing power to the wheels 16 with the combustion engine 28 and the electric motor 30 in an alternating manner and/or with the combustion engine 28 and the electric motor 30 simultaneously. In order to power the electric motor 30, DC power is provided from the battery 22 (and, in the case of a fuel cell automobile, a fuel cell) to the inverter 24, which converts the DC power into AC power, before the power is sent to the electric motor 30. As will be appreciated by one skilled in the art, the conversion of DC power to AC power is substantially performed by operating (i.e., repeatedly switching) the transistors within the inverter 24 at a "switching frequency," such as, for example, 12 kilohertz (kHz).

Referring to FIG. 2, generally, the controller 36 produces a Pulse Width Modulation (PWM) signal for controlling the switching action of the inverter 24. The inverter 24 then converts the PWM signal to a modulated voltage waveform for operating the motor 30. The inverter control system 34 of FIG. 2 consists of multiple operations during normal, or forward, operation including, but not limited to, receiving a torque command, converting the torque command to current commands based on present speed and available voltage, and performing regulation on such current commands. The output of the current regulator (not shown) is the output voltage needed to produce the requested currents. The PWM modulator 38 and the gate driver 39 generate the necessary gate pulses (or duty cycles) which are sent to the inverter 24 to control the electric motor 30 to the desired speed and/or torque. Additional considerations may be employed by the forward control path such as system temperatures, limitations, and additional communications or feedbacks to the overall system control in terms of operating status and availability.

According to one aspect of the present invention, when motor operation is initiated (or is reset), a "three-phase short" is generated within the inverter 24. During the three-phase short, the current through the windings in the motor is monitored. If the current is below a predetermined threshold, it is determined that the speed of the motor (i.e., the rate of rotation of the rotor relative to the stator) is low. In such a case, "normal" operation and/or control of the motor may then be performed using, for example, a sensorless control algorithm, as is commonly understood. If the current during the three-phase short is above the predetermined threshold, it is determined that motor speed is relatively high. In such a case, the current angle in the synchronous frame of reference (i.e., a d-q coordinate system), as is commonly understood, is used to calculate the initial position and speed of the motor (i.e., the rotor). After a predetermined amount of time, the operation and/or control of the motor then switches to the normal operation state (e.g., using a sensorless algorithm).

It should be noted that it is assumed that the short circuit current of the permanent magnet motor is less than the demagnetization current level of the permanent magnet rotor. As such, the motor terminals may be shorted for a longer period of time than the time constant of the stator.

In steady state operation, the voltage equation of the motor may be expressed as $$\vec{v}_S = r_S \vec{i}_S + L_S \frac{d}{dt}\vec{i}_S + j\omega_r \Psi_f e^{j\theta_r(t)} = r_S \vec{i}_S + L_S \frac{d}{dt}\vec{i}_S + \vec{E}_S, \tag{1}$$

where $\theta_r(t)=\omega_r t+\theta_{r0}$, $r_s$ is the stator resistance, $L_s$ is the motor inductance, $\Psi_f$ is the magnetic flux due to the permanent magnet, and $\omega_r$ and $\theta_r$ are the motor speed and position, respectively.

If the initial speed $\omega_r$ is non-zero, then the back EMF voltage induces the short-circuit current of the motor when the three phases are shortened ($v_s=0$). The motor current in the synchronous frame may then be expressed as $$\vec{i}_S(t) = \frac{\omega_r \Psi_f}{jL_S} \cdot \frac{\exp(j\theta_{r0})}{\frac{1}{\tau}+j\omega_r} \cdot \left[\exp(j\omega_r t)-\exp\left(-\frac{t}{\tau}\right)\right], \tag{2}$$

where $\tau=L_s/r_s$. As such, the synchronous frame motor current becomes zero if the motor speed approaches to zero. The current is further simplified in the steady state ($t \gg \tau$), if the motor speed is sufficiently high ($\omega r \gg 1/\tau$), as $$\vec{i}_S(t) = -\frac{\Psi_f}{L_S} \cdot \exp[j\theta_r(t)] \tag{3}$$

The motor position ($\theta r$) may then be calculated as $$\theta_r(t)=\arg[\vec{i}_s(t)]-\pi \tag{4}$$

Figure 4:
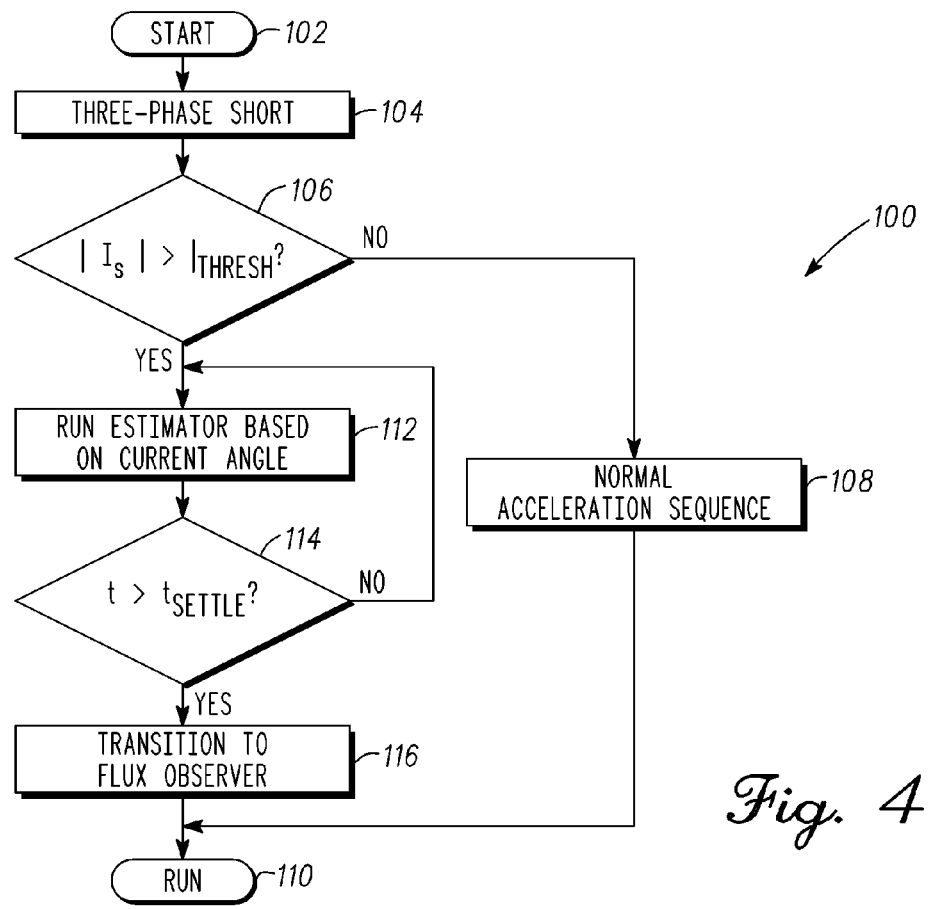
FIG. 4 is a flow chart of a method of initiating the operation an electric motor, in accordance with one embodiment of the present invention.

FIG. 4 illustrates a method (and/or system) 100 of initiating the operation of an electric motor, in accordance with one embodiment of the present invention. At step 102, the motor controller initiates motor operation (or is reset). At step 104, a three-phase short is performed. That is, either all of the high switches 52, 54, and 56 (FIG. 3) in the inverter 24 are activated, or all of the low switches 58, 60, and 62 are activated.

At step 106, during the three-phase short, the winding current is monitored (e.g., using current sensors 66). If the measured current amplitude ($I_s$) during the three-phase short is below a predetermined threshold ($I_{thresh}$), it may be assumed that the motor speed is low. The method then proceeds to step 108 where a low speed control technique, such as a conventional acceleration algorithm, is used to estimate the position of and control the motor. The method 100 then proceeds to step 110 where the motor may undergo normal operation, using, for example, a sensorless control algorithm.

If, during the three-phase short, the current amplitude is higher than the threshold, then the initial motor speed may be assumed to be high, and the method proceeds to step 112. At step 112, the position of the motor is estimated (and the motor is controlled) based on the calculated current angle. As provided by the loop generated by step 114, the current angle is used for a predetermined amount of time ($t_{settle}$). After the predetermined duration, the method 100 proceeds to step 116 where the control of the motor is transitioned to the flux observer, and the motor undergoes normal operation (e.g., sensorless) at step 110.

Figure 5:
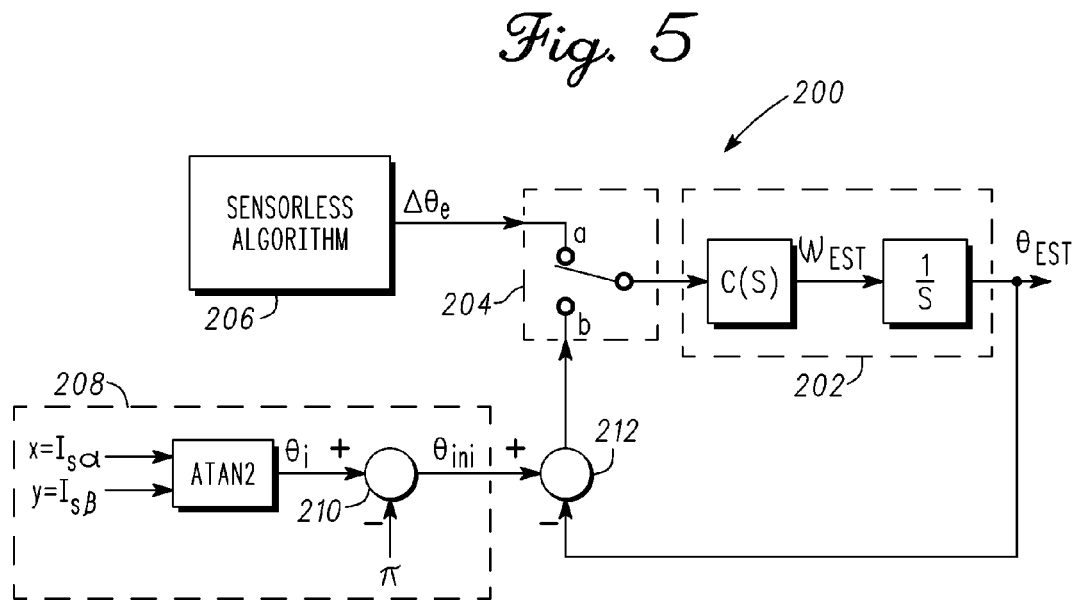
FIG. 5 is a block diagram of a system for controlling a motor which may be implemented within the method of FIG. 4.

FIG. 5 illustrates a system (and/or method) 200 for controlling a motor which may be implemented within the method shown in FIG. 4. The system 200 includes a position (and speed) estimator 202, an input switch 204, a sensorless algorithm block 206, and a current angle algorithm block 208. The position estimator 202 receives a position estimation error from either the sensorless algorithm block 206 or the current angle algorithm block 208, depending on the mode of the input switch 204.

When the system 100 is in the normal operating mode (i.e., at step 110 in FIG. 1), the input switch 204 is set to the 'a' mode, which causes the position estimator 202 to receive the calculated position error ($\Delta\theta_e$) from the sensorless algorithm block 206.

When the initial motor speed is identified as being high during the three-phase short (i.e., at step 112 in FIG. 1), the switch 204 is set to the 'b' mode, which causes the position estimator 202 to receive the calculated position error from the current angle algorithm block 208. The current angle algorithm block 208 calculates the initial angle of the motor using Equation 4 and summer 210, which subtracts $\pi$ from the current angle ($\theta_i$). Before being sent to the input switch 204, the output of the current angle algorithm block 208 is offset by the estimator output ($\theta_{est}$) at summer 212. As such, the error between the current angle (from Equation 4) and the position estimator 202 output drives the position estimator 202 to update the estimated position in the next cycle.

As previously mentioned, it takes time to achieve the steady state result of Equation 3, and it is preferable to stay at this mode for longer than the stator time constant ($\tau$). Thus, in step 106 of FIG. 4, there is a timer provided to allow a sufficient amount of time to pass. The duration ($t_{settle}$) has to be sufficiently higher than the stator time constant. After a sufficient time delay, the switch 204 in FIG. 5 is switched back to 'a' position to enter the normal sensorless control mode at 108 of FIG. 4.

In one embodiment, the sensorless algorithm utilizes motor flux (or flux linkage) and BEMF increments that are calculated or estimated based on currents and voltages (i.e., commanded or measured) within the motor. The estimated flux is compared with a measured flux. The flux and BEMF estimation is updated based on the flux and BEMF increment from the motor model and the flux error.

Such a system may include (as instructions stored on a computer or machine-readable medium) a motor model block, a flux model block, a flux observer block, a coordinate conversion block, and a speed and position observer block. The system may utilize the calculations of flux and back electromotive force (BEMF) implemented at the synchronously rotating reference frame (or synchronous frame) made by the flux observer block (or flux observer).

In one such embodiment, the motor model block (or motor model) receives a motor voltage and a motor current as input, along with an estimated flux and BEMF from the flux observer block. The motor model block generates increments of the flux and the BEMF for each sampling time (or each cycle of the PWM signal) which are sent to the flux observer block. The flux model block (or flux model) receives the motor current as an input and generates a measure of the motor flux from, for example, a flux table. A flux error is calculated from the difference of the estimated flux from the flux observer block and the measured flux from the flux model block at a summation circuit (or summer). The measured flux, or flux quantity, is also used as a feedforward control (or decoupling current) of the current control for the motor. The flux error and the increments from the motor model block are received as input by the flux observer block, which estimates the motor flux and BEMF.

The estimated flux accounts for the flux generated by the windings in the stator of the motor, while the flux generated by the permanent magnets in the motor is excluded. One advantage of such a method is that the estimated flux is not dependent on the temperature of the motor magnets, as it is determined by the geometry of the motor and the material properties of the stator and rotor core. The estimated BEMF corresponds to the voltage induced by the permanent magnet flux, and its angle contains the position estimation error.

The estimated position error is then sent to the speed and position observer block to estimate the rotor position and speed. Because the magnitude of the estimated BEMF is not used in the position and speed estimation, the temperature variation of the rotor, especially the permanent magnet, does not affect the estimation of the rotor position and speed.

Other embodiments may utilize the method and system described above in implementations other than automobiles, such as watercraft and aircraft. The electric motor and the power inverter may have different numbers of phases, such as two or four. Other forms of power sources may be used, such as current sources and loads including diode rectifiers, thyristor converters, fuel cells, inductors, capacitors, and/or any combination thereof.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for controlling an electric motor comprising a plurality of windings, each winding being coupled to a respective set of first and second switches, the method comprising:
   simultaneously activating the first switch of each set of switches;
   measuring current flow through the plurality of windings while the first switch of each set of switches is activated;
   controlling the electric motor according to a first motor control method if the measured current is below a predetermined threshold; and
   controlling the electric motor according to a second motor control method if the measured current is above the predetermined threshold,
   wherein controlling the electric motor according to the second motor control method further comprises:

controlling the electric motor based on the measured current for a predetermined amount of time; and
after the predetermined amount of time, controlling the electric motor with the first motor control method.

2. The method of claim 1, wherein the electric motor further comprises a stator and a rotor rotatably coupled to the stator.

3. The method of claim 2, wherein the first motor control method comprises determining a position of the rotor relative to the stator based on a first motor position algorithm, and the second motor control method comprises determining the position of the rotor relative to the stator based on a second motor position algorithm.

4. The method of claim 3, wherein the second motor position algorithm is based the measured current.

5. The method of claim 4, wherein the first motor position algorithm is a sensorless motor position algorithm.

6. The method of claim 3, wherein the second motor position algorithm comprises a determination of a current angle on a synchronous frame of reference coordinate system based on the measured current.

7. A machine-readable medium having a set of instructions stored thereon that when performed by a machine cause a method to be performed, the method comprising:
simultaneously activating a first switch of each of a plurality of sets of switches having first and second switches, the plurality of sets of switches being coupled to a plurality of windings in an electric motor, the electric motor further comprising a stator and a rotor rotatably coupled to the stator, with the activation of the first switch of each of the plurality of sets of switches causing a short;
monitoring current flow through the plurality of windings while the first switch of each set of switches is activated during the short;
controlling the electric motor according to a first motor control method if the measured current is below a predetermined threshold; and
controlling the electric motor according to a second motor control method if the measured current is above the predetermined threshold,
wherein controlling the electric motor according to the second motor control method further comprises:
controlling the electric motor based on the measured current for a predetermined amount of time; and
after the predetermined amount of time, controlling the electric motor with the first motor control method.

8. The machine-readable medium of claim 7, wherein the first motor control method comprises determining a position of the rotor relative to the stator based on a first motor position algorithm, and the second motor control method comprises determining the position of the rotor relative to the stator based on a second motor position algorithm.

9. The machine-readable medium of claim 8, wherein the second motor position algorithm is based the measured current.

10. The machine-readable medium of claim 9, wherein the first motor position algorithm is a sensorless motor position algorithm.

11. The machine-readable medium of claim 8, wherein the second motor position algorithm comprises a determination of a current angle on a synchronous frame of reference coordinate system based on the measured current.

12. An automotive propulsion system comprising:
an internal combustion engine;
an electric motor comprising a plurality of windings, at least one of the internal combustion engine and the electric motor coupled to one or more drive shafts of the automotive propulsion system;
a direct current (DC) voltage supply coupled to the electric motor;
a power inverter comprising a plurality of sets of switches coupled to the windings and the DC voltage supply, each of the plurality of sets of switches comprising a first switch and a second switch; and
a processor in operable communication with the electric motor, the DC voltage supply, and the power inverter, the processor being configured to:
simultaneously activate the first switch of each of the plurality of sets of switches;
measure current flow through the plurality of windings while the first switch of each of the plurality of sets of switches is activated;
control the electric motor according to a first motor control method if the measured current is below a predetermined threshold; and
control the electric motor according to a second motor control method if the measured current is above the predetermined threshold,
wherein the control of the electric motor according to the second motor control method further comprises:
control the electric motor based on the measured current for a predetermined amount of time; and
after the predetermined amount of time, control the electric motor with the first motor control method.

13. The automotive propulsion system of claim 12, wherein the electric motor further comprises a stator and a rotor rotatably coupled to the stator.

14. The automotive propulsion system of claim 13, wherein the first motor control method comprises determining a position of the rotor relative to the stator based on a first motor position algorithm, and the second motor control method comprises determining the position of the rotor relative to the stator based on a second motor position algorithm.

15. The automotive propulsion system of claim 14, wherein the second motor position algorithm is based the measured current.

16. The automotive propulsion system of claim 15, wherein the first motor position algorithm is a sensorless motor position algorithm.

17. The automotive propulsion system of claim 14, wherein the second motor position algorithm comprises a determination of a current angle on a synchronous frame of reference coordinate system based on the measured current.

* * * * *